United States Patent
Oetken

(10) Patent No.: US 10,961,666 B2
(45) Date of Patent: Mar. 30, 2021

(54) DETERMINE SONIC SENSOR ANGLE USING LASER SHAPE

(71) Applicant: Caterpillar Paving Products Inc., Brooklyn Park, MN (US)

(72) Inventor: Nicholas A. Oetken, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 158 days.

(21) Appl. No.: 16/173,257

(22) Filed: Oct. 29, 2018

(65) Prior Publication Data

US 2020/0131719 A1    Apr. 30, 2020

(51) Int. Cl.
*E01C 19/00*    (2006.01)
*E01C 19/48*    (2006.01)

(52) U.S. Cl.
CPC ............ *E01C 19/006* (2013.01); *E01C 19/48* (2013.01)

(58) Field of Classification Search
CPC .... E01C 19/4893; E01C 19/48; E01C 19/006; E01C 19/00
See application file for complete search history.

(56) References Cited

U.S. PATENT DOCUMENTS

| | | | | |
|---|---|---|---|---|
| 4,769,700 A | * | 9/1988 | Pryor | A01B 69/008 348/120 |
| 5,201,604 A | * | 4/1993 | Ferguson | E01C 19/008 404/110 |
| 5,258,961 A | * | 11/1993 | Sehr | E01C 19/006 367/96 |
| 5,327,345 A | * | 7/1994 | Nielsen | E01C 19/006 172/4.5 |
| 5,575,583 A | * | 11/1996 | Grembowicz | E01C 19/48 404/72 |
| 6,450,730 B1 | * | 9/2002 | Matthias | E01C 19/4893 404/101 |
| 8,068,962 B2 | | 11/2011 | Colvard | |
| 8,070,385 B2 | | 12/2011 | Green | |
| 9,004,811 B2 | | 4/2015 | Mings et al. | |
| 9,347,186 B2 | * | 5/2016 | Frelich | E01C 19/48 |
| 10,633,803 B2 | * | 4/2020 | Hojland | E01C 19/006 |
| 2012/0033065 A1 | * | 2/2012 | Eul | E01C 19/006 348/86 |
| 2013/0051913 A1 | * | 2/2013 | Eul | E01C 19/006 404/84.5 |
| 2014/0165693 A1 | * | 6/2014 | Buschmann | E01C 19/006 73/1.79 |
| 2018/0237999 A1 | * | 8/2018 | Hojland | E01C 19/004 |
| 2020/0142183 A1 | * | 5/2020 | Min | G02B 26/0883 |

FOREIGN PATENT DOCUMENTS

DE    19918618    11/1999

* cited by examiner

*Primary Examiner* — Abigail A Risic
(74) *Attorney, Agent, or Firm* — Schwegman, Lundberg & Woessner

(57) ABSTRACT

A system for distributing a material over a surface includes a sensor configured to transmit a sonic signal from a position on the system to a surface of a quantity of the material. The system also includes a device to project an image onto the surface of the quantity of the material. The device is adjustable in relation to the sensor to cause the image to have a specified shape when the sonic signal impacts the surface of the quantity of the material at a specified angle, and a different shape when the sonic signal impacts the surface of the quantity of the material at different angle.

20 Claims, 6 Drawing Sheets

DETERMINE SONIC SENSOR ANGLE USING LASER SHAPE

TECHNICAL FIELD

This document pertains generally, but not by way of limitation, to machine sensors, and more particularly, to determining the orientation of a sonic sensor relative to a target surface.

BACKGROUND

Paving machines, such as asphalt pavers or asphalt finishers, include a class of construction equipment that are used to deposit a specified distribution of a paving material, such as asphalt, over a base surface, such as a road or bridge. In operation, a paving machine can receive paving material as it is discharged from truck and conduct the paving material to a receiving side of an auger using a conveyor belt. The auger can be controllably rotated to deposit a regulated amount of the paving material in front of a screed. The screed can be dragged behind the paving machine to form a substantially smooth surface by compacting the deposited paving material.

The smoothness and consistency of paving material compacted by a screed can be controlled by adjusting, amongst other things, the amount of paving material deposited by the auger in front of the screed. A control system for regulating the amount of paving material deposited in front of the screed can include a feedback component, such as sonic sensor, for measuring the height of the paving material deposited in front of the screed, and a control or actuating component, such as for adjusting the rotational speed of the auger based on the measure height, such as to control the rate at which the paving material is deposited. As an example, the rotational speed of an auger can be increased when an insufficient amount of material is delivered in front of a screed, while the rotational speed of the auger can be decreased when the amount of material delivered in front of the screed is excessive.

Sonic sensors used to measure the height of paving material deposited in front of a screed need to have a specific orientation with respect to the surface of the paving material being measured to provide accurate distance, or height, measurements. When these sensors are positioned incorrectly, ultrasonic signals emitted by the sensors, such as to measure distance, cannot return to the sensor for detection at the right angle, causing errors in the resulting measurements derived from such signals. Ensuring that the sonic sensors are oriented correctly can be difficult due to irregularities in the surface of the paving material, and because the ultrasonic signals emitted by such sensors are generally not visible to a paving machine operator.

SUMMARY OF THE INVENTION

Embodiments of the present disclosure include a system for distributing a material over a surface. The system can include a sensor configured to transmit a sonic signal from a position on the system to a surface of a quantity of the material. The system can also include a device to project an image onto the surface of the quantity of the material, where the device is adjustable in relation to the sensor to cause the image to have a specified shape when the sonic signal impacts the surface of the quantity of the material at a specified angle, and a different shape when the sonic signal impacts the surface of the quantity of the material at different angle.

Embodiments of the present disclosure include a method for operating a machine for depositing a paving material over a surface using an auger and a screed. The method can include providing a sensor that is configured to measure a distance to a surface using a sonic signal. The method can also include providing a light emitting device that is configured to project, onto the surface, a visual indicator of an angle at which the sonic signal meets the surface, where the visual indicator includes a specified shape on the surface when the angle is within a threshold angular degree of a specified angle, and a different shape on the surface when the angle is not within the threshold angular degree of the specified angle.

Embodiments of the present disclosure can include a device to measure a height of paving material deposited in front of a screed by an auger. The device can include a sensor to transmit a sonic signal to a surface of the paving material. The device can also include a light emitting device coupled to the sonic sensor to project an image substantially parallel to a transmit direction of the sonic signal. The light emitting device can be configured to cause the image to have a specified shape on the surface of the paving material when the sonic signal impacts the surface of the paving material at an angle that is substantially normal to the surface of the paving material, and a different shape on the surface of the paving material when the sonic signal impacts the surface of the material at an angle that is not substantially normal to the surface of the paving material.

DETAILED DESCRIPTION

Figure 1:
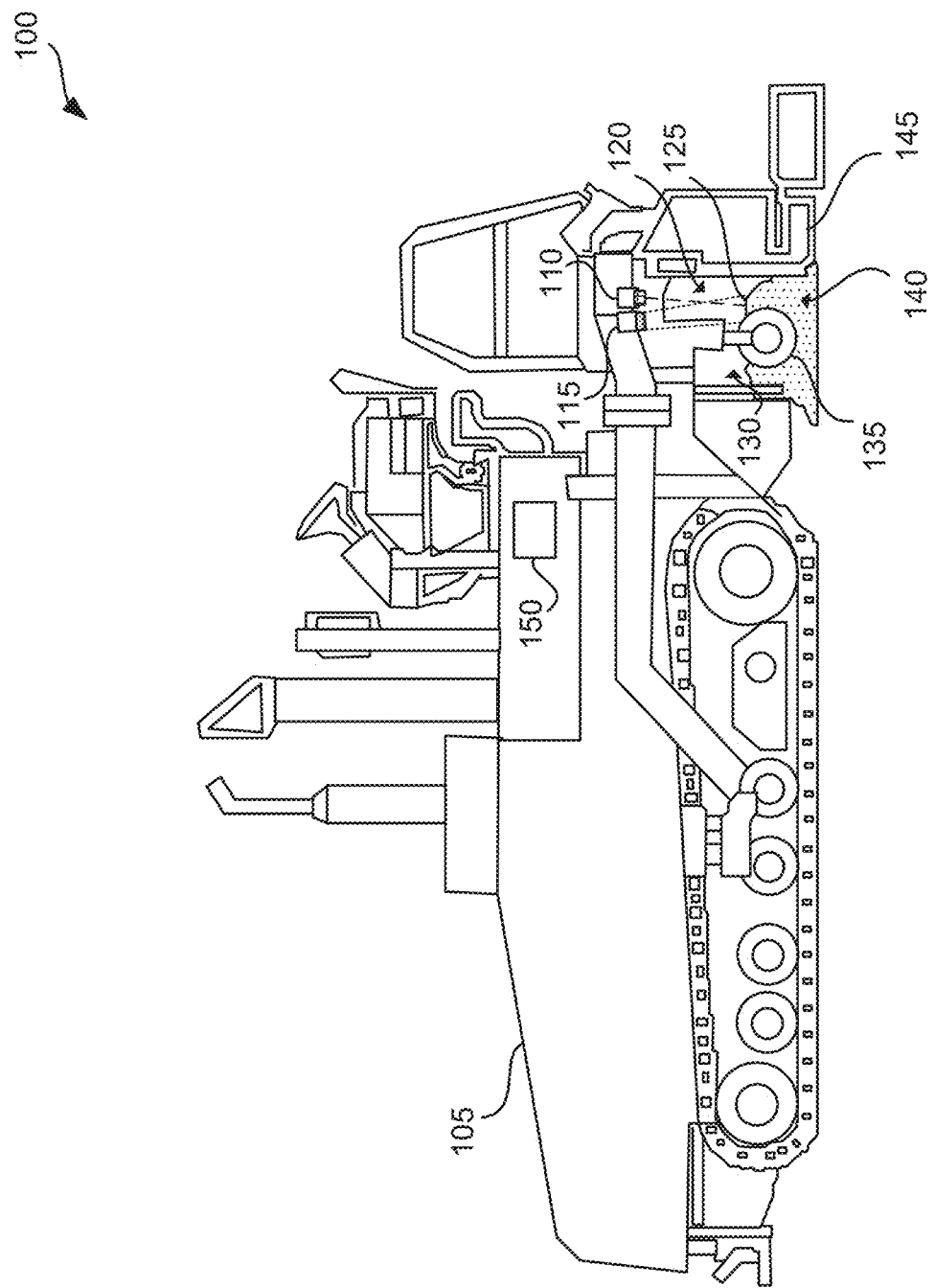
FIG. 1 illustrates a diagram an example of a system configured to project an image onto a surface to determine an orientation of a sensor, according to various embodiments.

FIG. 1 illustrates a diagram an example of a system 100 configured to project an image onto a surface 125 to determine the orientation of a sensor 110, according to various embodiments. The system 100 can include a machine 105 and a screed 145. The machine 105 can be a construction machine, such as a paver, configured to deposit a quantity of paving material 140 in a region 120 in front of the screed 145. The screed 145 can be a compaction device used to compact the paving material 140. In some embodiments, the screed 145 can be towed behind the machine 105, while in other embodiments the screed can be a component of the machine. The machine 105 can include the sensor 110, a light emitting device 115, an auger 135, and a controller 150.

The sensor 110 can be any sensor configured to generate data indicative of a physical measurement, such as a distance, based on a signal reflected from a surface and detected by a detection device associated with the sensor, such that the accuracy of such sensor can impacted by the angle at which the signal is reflected. In some embodiments, the sensor 110 can be a sonic sensor configured to use a sonic signal, such as an ultrasonic pulse or signal, to measure a distance from the sensor to a surface, such as the surface 125 of the paving material deposit 140.

The light emitting device 115 can be any device configured to project an image having an indicated shape onto a surface, such as the surface 125. In some embodiments, the light emitting device 115 can include a laser, or a set of one or more lasers, configured to emit light at an indicated wavelength, such as visible light. The laser can be coupled to an actuator, such as a motor or other rotationally or linearly actuatable hardware component. The actuator can be controlled, such as by the controller 150 or a controller integrated in the light emitting device 115, to cause light emitted by the laser to form a pattern or shape on a surface. In some embodiments, the actuator can rotate the laser in a circlet have a specified radius, such as to cause light emitted by the laser to form, or project, an image having a circular shape onto a surface. Images having other shapes can be projected by using a laser, or other light source, and an actuator configured to actuate the laser according to other patterns. In some embodiments, the light emitting device 115 can include a set of three or more lasers arranged to project an image having a specified shape or pattern, such as determined by the configuration of the three or more lasers, on a surface. Such an image can include any two-dimensional shape or pattern, such as triangle or other polygon having vertices indicated by laser points generated by the three or more lasers.

In some embodiments, the sensor 110 and the light emitting device 115 can be integrated in a single device, substrate, or hardware module. Such an integrated device can include the sensor 110 coupled to a substrate or other support structure. Such an integrated device can also include the light emitting device 115 coupled to the substrate or other support structure and configured (e.g. orientated) to project an image along a path that is substantially parallel to a path traversed by a sonic signal transmitted by the sensor 110.

In some embodiments, the sensor 110 or the light emitting device 115 can be independently adjustable. Adjusting the sensor 110 or the light emitting device 115 can include changing the position of the sensor 110 or the position of the light emitting device 115 relative the machine 105, or relative to another component of the system 100. Adjusting the sensor 110 or the light emitting device 115 can also include changing the orientation of the sensor 110 or the orientation of the light emitting device 115 relative the machine 105, or relative another component of the system 100. The sensor 110 or the light emitting device 115 can be adjusted to cause an image projected onto the surface 125 by the light emitting device to have a specified shape when an angle between the surface 125 and signal, such as a sonic signal, transmitted by the sensor 110 is within a threshold angular value of a specified angle. In an example, the sensor 110 or the light emitting device 115 can be adjusted to cause an image projected onto the surface 125 by the light emitting device to have the shape of a substantially equilateral triangle when an angle between the surface 125 and a sonic signal transmitted by the sensor 110 is substantially 90-degrees (e.g., the angle is within 5-degrees of a specified 90-degree angle). An orientation of the sensor 110 or an orientation of the light emitting device 115 can be adjusted to cause an image projected onto the surface 125 by the light emitting device to have a specified shape when an angle between the surface 125 and a sonic signal transmitted by the sensor 110 is within a threshold angular value of other specified angles.

Returning to the discussion of the components of the machine 105, the auger 135 can be any suitable auger configured to control the distribution of a quantity of the paving material 140 received from a region 130 and deposited in front the screed 145 in the region 120.

The controller 150 can be an electronic control unit, such as an embedded microcontroller or other computing device, configured, such as by specially programmed software or specially configured hardware circuits, to use data received from the sensor 110 to determine a height of the paving material 140 in the region 120, and to regulate the rotational speed of the auger 135 based on such determined height.

In operation, machine 105 can deposit paving material 140, such as by using the conveyor belt 305 (FIG. 3), at a receiving side of the auger 135 in region 130. The auger 140 can be controllably rotated, such as under the control of the controller 150, to distribute the paving material 140 in front of the screed 145 in the region 120. The height of the paving material 140 in the region 120 can be monitored by controller 150, or by an operator of the machine 105, using the sensor 110, such as to enable to the controller or the operator to regulate the rotational speed of the auger 135 to maintain the quantity of the paving material in the region 120 at a desired height. In some embodiments, the light emitting device 115 can be used, such as by the operator or by the controller 150, to calibrate the orientation of the sensor 110. Calibrating the sensor 110 can include setting the angle at which sonic signals emitted by the sensor impact, or reach, the surface 125. An operator, for example, can manually adjust the orientation of the sensor 110 and the orientation of the light emitting device 115 until an image projected onto the surface 125 by the light emitting device has a specified shape, indicating that the sensor is has a specified orientation.

Figure 2:
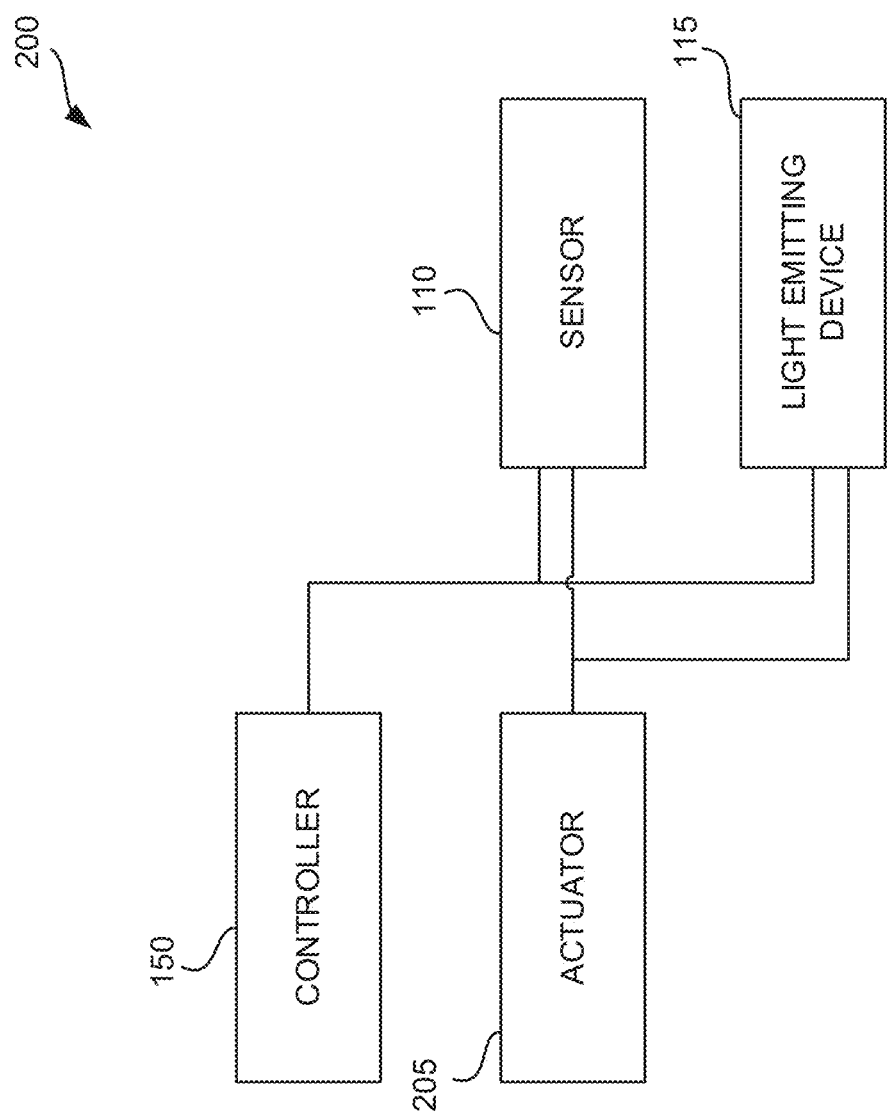
FIG. 2 illustrates a block diagram of an example of a system for using a projected image to determine an angle between a sensor and a surface, according to various embodiments.

FIG. 2 illustrates a block diagram of an example of a system 200 for using a projected image to determine an angle between a sensor 110 and a surface, according to various embodiments. The system 200 can be an example of the system 100. The system 200 can include the controller 150, an actuator 205, the sensor 110, and the light emitting device 115. The sensor 110, the light emitting device 115, and the controller 150 can be substantially as described in the discussion of FIG. 1. The actuator 205 can be any mechanical or electromechanical device configured to actuate the sensor 110 or the light emitting device 115. Such actuation can include adjusting the position or the orientation of the sensor 110 or the light emitting device 115. Such actuation can include actuating a component of the light emitting device, such as a laser, to project an image having a specified shape or pattern, as described herein. In some embodiments, the actuator 205 can be manually controlled, such as by an operator, while in other embodiments, the actuator can be electronically controlled, such as by the controller 150.

Figure 3A:
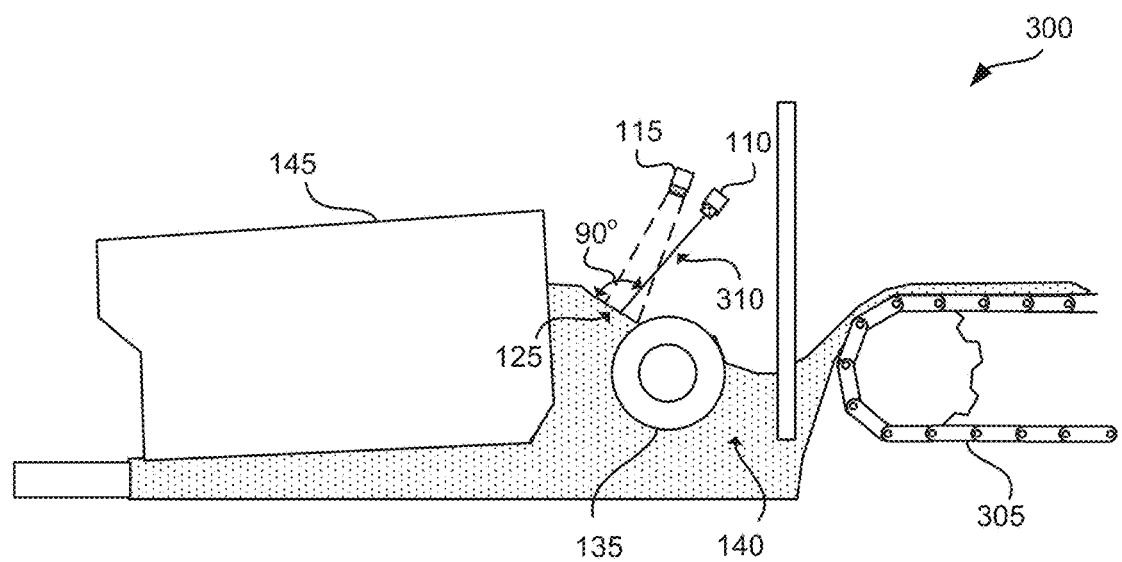
FIG. 3A illustrates a diagram of an example of a system configured to project an image onto a surface to determine an orientation of a sensor, according to various embodiments.

Although the components of the system 200 are illustrated as separate components, one or more of these components can be integrated in a single device. In certain embodiments, one or more of a sensor 110, a light emitting device 115, or a controller 150 can be integrated, or coupled, in a single device. In some embodiments, the light emitting device 115 can include a controller 150, or an actuator 205. S FIG. 3A illustrates a diagram of an example of a system 300 configured to project an image onto a surface to determine an orientation of a sensor 110, according to various embodiments. The system 300 can be an embodiment, or a view of, of the system 100 (FIG. 1) or the system 200 (FIG. 2). The system 300 can include the sensor 110, the light emitting device 115, the auger 135, and the screed 145. The system 300 can also include a conveyor belt 305, such as for depositing paving material 140 at a receiving side of the auger 135. As shown in FIG. 3A, it can be desirable to orient the sensor 110 at a 90-degree angle with respect to the surface 125, such as to cause a sonic signal 310 that is transmitted from the sensor to impact the surface of the paving material 140 at a 90-degree angle. The sensor 110 can be configured with this orientation by adjusting the orientation of the light emitting device 115 and the orientation of the sensor in a fixed relationship (e.g., adjusting the light emitting device and the sensor as a single fixedly coupled unit) until the light emitting device projects an image, such as the image 315 (FIG. 3B), having an specified shape onto the surface 125. Generally, an operator, or an electronic controller, can adjust the orientation of the sensor 110 with the orientation of the light emitting device 115 until the projected image has a specified shape on the surface 125, such as to provide a visual indication that the orientation of the sensor with respect to the surface will cause a sonic signal 310 transmitted by the sensor to impact the surface at a specified angle. In some embodiments the orientation of the light emitting device 115 can be selected to cause the projected image to have the specified shape when both the light emitting device and the sensor has the same angular orientation, such as a 90-degree orientation with respect to the surface 125. The specified shape is obtained when the angle at which the light projected by the light emitting device 115 coincides with the specified angle of the sensor 110 with respect to the surface 125.

Figure 3B:
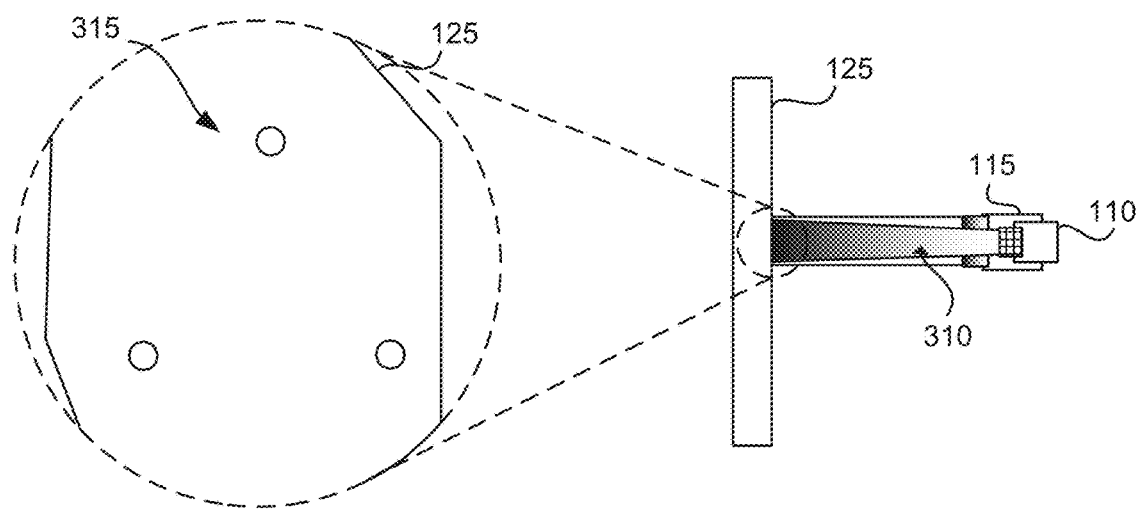
FIG. 3B illustrates an example of a projected image having a shape, such as an equilateral triangle, to indicate an angle between the sensor and a surface, according to various embodiments.

FIG. 3B illustrates an example of a projected image 315 having a shape, such as an equilateral triangle, to indicate an angle between the sensor 110 and the surface 125, according to various embodiments. The image 315 can be an example of an image projected by the light emitting device 115 when the sensor 110 has an orientation that causes a transmitted sonic signal 310 to impact the surface 125 at a desired angle, such as a substantially at 90-degree angle. As shown in FIG. 3B, the image 315 can have a shape formed by three lasers, or other light emitting devices, such as by emitting light to indicate the vertices of the shape. In FIG. 3B, the light emitting device 115 is configured to form an equilateral triangle when the sensor 110 is orientated at the specified angle.

Figure 4A:
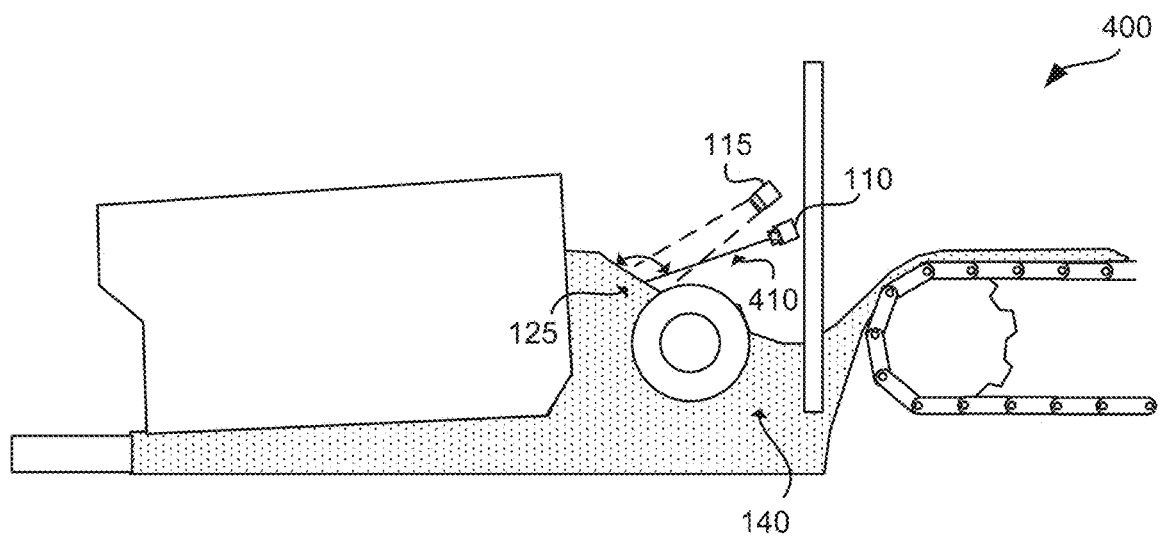
FIG. 4A illustrates a diagram of an example of a system configured to project an image onto a surface to determine an orientation of a sensor, according to various embodiments.

FIG. 4A illustrates a diagram of an example of a system 400 configured to project an image onto a surface to determine, or to indicate, an orientation of the sensor 110, according to various embodiments. The system 400 can be an example of the system 300, modified to illustrate the sensor 110 having an orientation selected to cause a sonic signal 410 emitted by the sensor to impact the surface 125 of the paving material 140 at an angle that is larger than a specified angle (e.g., larger than a 90-degree angle). As shown, the orientation of the light emitting device 115 is also adjusted with the orientation of the sensor 110, so as to cause an image projected by the light emitting device onto the surface 125 to be stretched or compressed to have a shape that is different from a specified shape selected to indicate that the sensor 110 is at a desired angle with respect to the surface 125. The stretched or compressed image can be an artifact of the angle at which light from the light emitting device 115 impacts the surface 125.

Figure 4B:
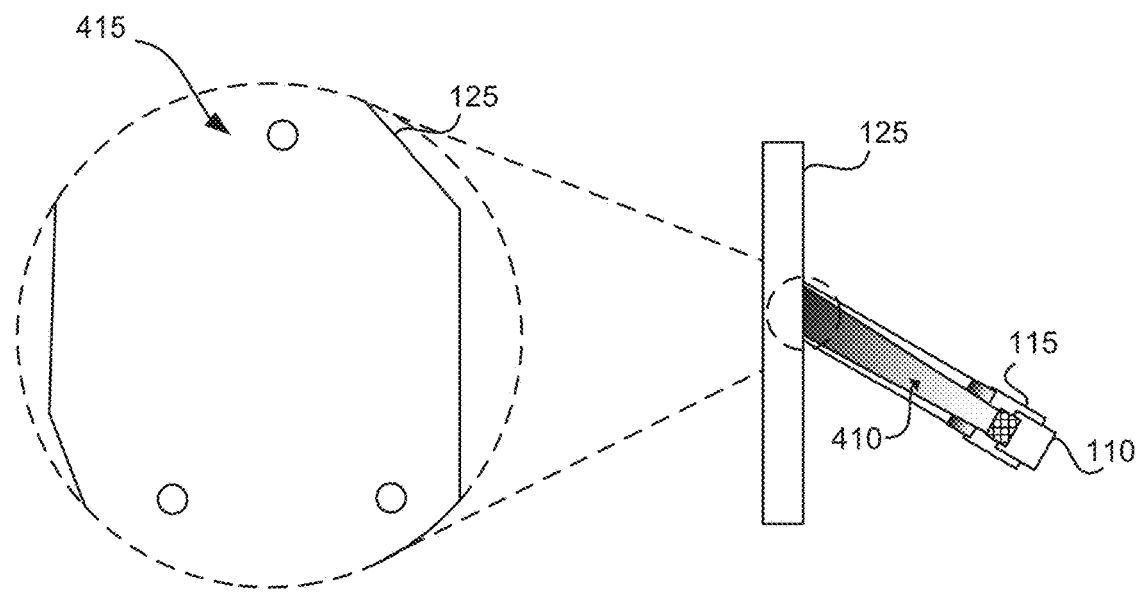
FIG. 4B illustrates an example of a projected image having a shape, to indicate an angle between a sensor and a surface, according to various embodiments.

FIG. 4B illustrates an example of a projected image 415 having a shape, such as a non-equilateral triangle, to indicate an angle between the sensor 110 and the surface 125, according to various embodiments. The image 415 can be an example of the image projected by the light emitting device 115 when the sensor 110 is orientated cause the transmitted sonic signal 410 to impact the surface 125 at an angle that this larger or smaller than a specified angle, such as a 90-degree angle. Here, the light emitting device 115 is configured form a non-equilateral, or stretched, triangle when the sensor 110 is not orientated at the specified angle.

Figure 5A:
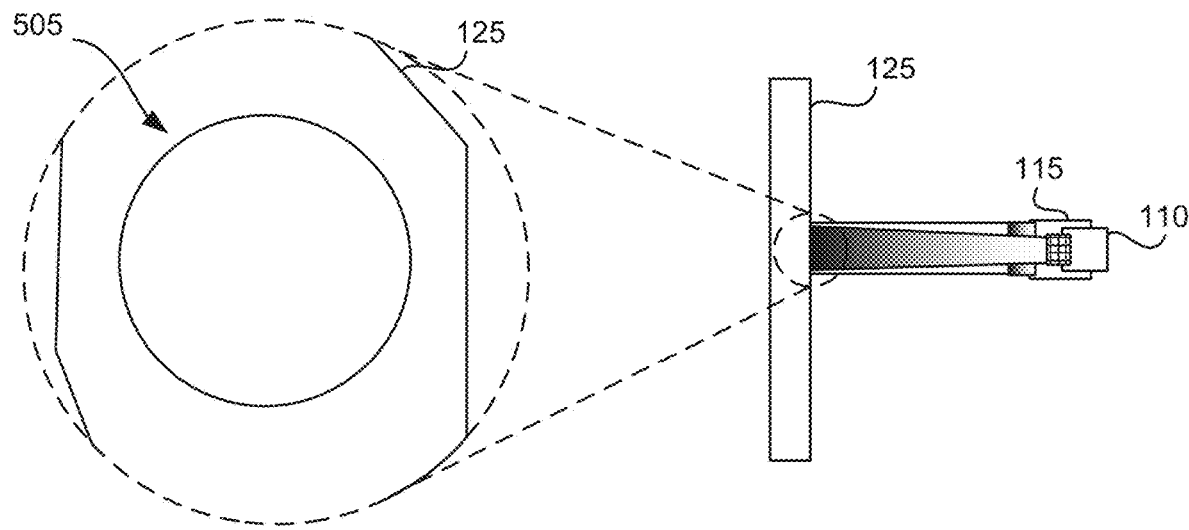
FIG. 5A illustrates an example of a projected image having a shape, to indicate an angle between a sensor and a surface, according to various embodiments.

FIG. 5A illustrates an example of a projected image 505 having a shape, such as a circle, to indicate an angle between the sensor 110 and the surface 125, according to various embodiments. The image 505 can be an example of an alternate image projected by the light emitting device 115 when the sensor 110 is orientated cause a transmitted sonic signal to impact the surface 125 at a specified angle, or within an threshold angular degree of the specified angle. The image 505 can have a shape formed by a single laser, or other light emitting device, that is actuated to trace a projected pattern onto the surface 125. Here, the light emitting device 115 is configured form a circle when the sensor 110 is orientated at a specified 90-degree angle and rotated by an actuator.

Figure 5B:
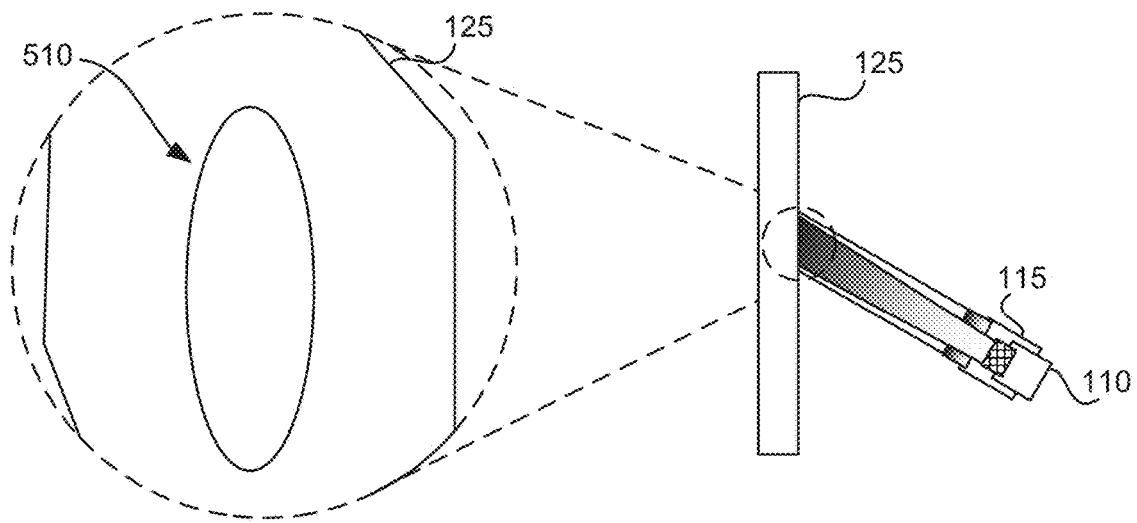
FIG. 5B illustrates an example of a projected image having a shape, such as an ellipse of oval, to indicate an angle between a sensor and a surface, according to various embodiments.

FIG. 5B illustrates an example of a projected image 510 having a shape, such as an ellipse or oval, to indicate an angle between the sensor 110 and the surface 125, according to various embodiments. The image 510 can be an example of the image projected by the light emitting device 115 when the sensor 110 is orientated cause a transmitted sonic signal to impact the surface 125 at an angle that this larger or smaller than a specified 90-degree angle. Here, the light emitting device 115 is configured to use single laser, or other light emitting component, to form an ellipse or oval when the sensor 110 is not orientated at the specified 90-degree angle.

Figure 6:
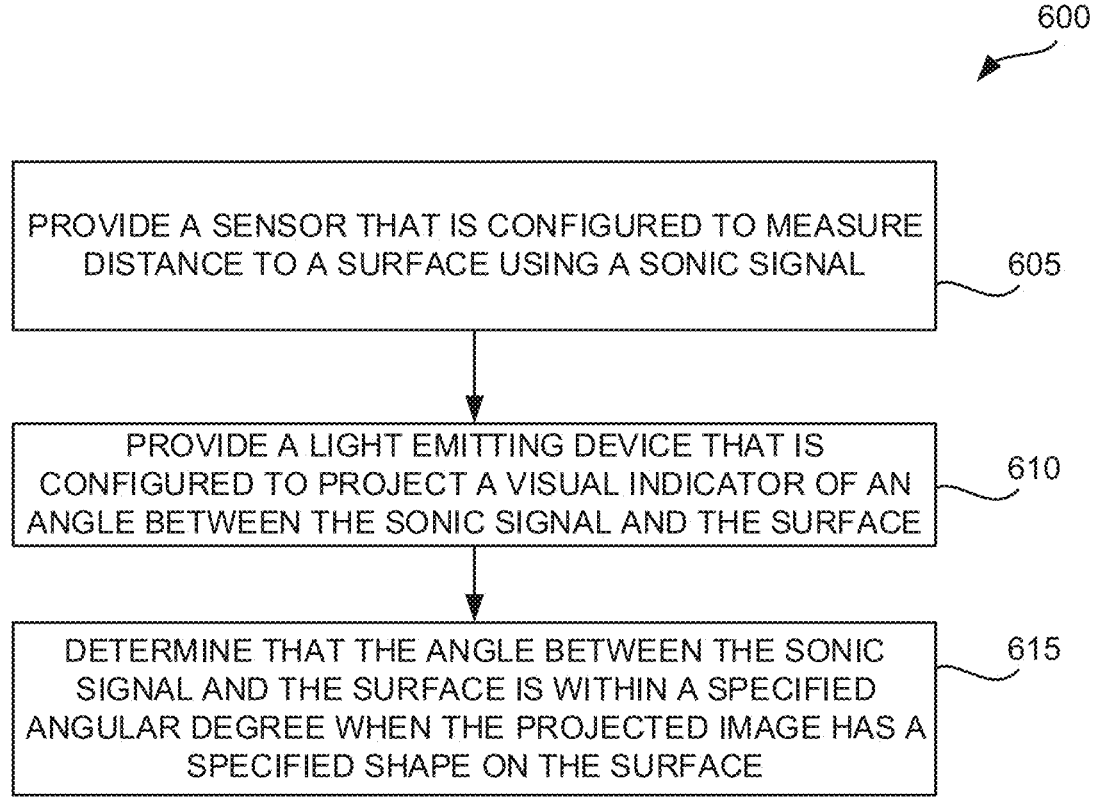
FIG. 6 illustrates a diagram of a process for using a projected image to determine an angle between a sensor and a surface of a deposited material, according to various embodiments

FIG. 6 illustrates a diagram of a process 600 for using a projected image to determine an angle between a sensor and a surface, according to various embodiments. The process 600 can be executed by an entity to provide or implement the systems, techniques, device, and operations described herein. One or more operations of the process 600 can be implemented by a computing device having a non-transitory computer-readable storage medium that is configured with specially programmed computer executable code to execute such operations.

At 605, a sensor can be provided. The sensor can be an example of the sensor 110. Such sensor can be configured to measure a distance to a surface using a sonic signal, as described herein. Such measuring can include generating data indicative of a distance and processing the data to determine the measured distance. At 610, a light emitting device can be provided. The light emitting device can be an example of the light emitting device 115. Such light emitting device can be configured to project an image (e.g. a visual indicator) of an angle between a target surface and a sonic signal transmitted by the sensor. The image can have a specified shape when the angle between the target surface and the sonic signal is within a threshold angular degree, while the image can have another shape when the angle between a sonic signal transmitted by the sensor and a target surface is not within the threshold angular degree. The difference between the shapes can be an artifact of the at which light emitted by the light emitting device impacts the target surface. At 615, the image can be used to determine that the angle between the sonic signal and the surface is within a threshold angular degree of a indicated angle when the projected image has a specified shape on the surface.

INDUSTRIAL APPLICABILITY

The techniques of the present disclosure couple a light emitting device with a sonic sensor on a paving machine, such as to enable an operator to determine the angle of the sonic sensor with respect to a surface of a quantity of paving material deposited in front of a screed. The light emitting device projects an image onto a surface of the paving material. The projected image, as shown on the surface, that has a first shape, such a square, when the angle between the sonic sensor and the surface of paving material is at a target angle, such 90-degrees. The projected image is skewed, stretched, or compressed, to form a different shape, such as a stretched rectangle, when the angle between the sonic sensor and the surface of the paving material deviates from the specified angle.

The techniques of the present disclosure can be used in paving machines to improve the accuracy of sonic sensors used to measure the height of paving material deposited in front of a screed. This can enable better control over the rotational speed of an auger used to distribute paving material in front of screed, which can result in more consistent or uniform compaction, or formation, of pavement by the screed.

What is claimed is:

1. A system for distributing a material over a surface, the system comprising:
   a sensor configured to transmit a sonic signal from a position on the system to impact a surface of a quantity of the material at a specified angle; and
   a device configured to indicate, based on an image projected onto the surface of the quantity of the material by the device, whether the sensor has an orientation relative to the surface of the quantity of material to cause the sonic signal to impact the surface of the quantity of material at the specified angle, the device adjustable in cooperation with the sensor to cause the image to have:
   a specified shape when the sensor has an orientation relative to the surface of the quantity of material to cause the sonic signal to impact the surface of the quantity of material at the specified angle, and
   a different shape when the sensor has an orientation relative to the surface of the quantity of material to cause the sonic signal to impact the surface of the quantity of material at an angle that is different from the specified angle.

2. The system of claim 1, wherein the device comprises three or more lasers to project the image, the three or more lasers configured to project the image as a two-dimensional pattern of laser points.

3. The system of claim 1, wherein the device comprises a laser to project the image, the laser coupled to an actuator, the actuator controllable to cause the laser to project the image as a shape having at least two-dimensions.

4. The system of claim 1, wherein an orientation of the device is adjustable relative to an orientation of the sensor to determine the specified angle.

5. They system of claim 1, wherein the device is fixedly coupled to the sensor.

6. The system of claim 1, wherein the specified shape is a regular polygon and the different shape is an irregular polygon.

7. A method for operating a machine for depositing a paving material over a surface using an auger and a screed, the method comprising:
   providing a sensor that is configured to measure a distance to a surface of the paving material by transmitting a sonic signal at a specified angle relative to the surface of paving material; and
   providing a light emitting device that is configured to indicate an angle of the sensor relative to the surface of the paving material by projecting a visual indicator of the orientation onto the surface of the paving material, the visual indicator comprising:
   a specified shape on the surface of the paving material when the the angle of the sensor relative to the surface of the paving material matches the specified angle within a threshold angular degree, and
   a different shape on the surface of the paving material when the angle of the sensor relative to the surface of the paving material does not match the specified angle within the threshold angular degree.

8. The method of claim 7, wherein the paving material is deposited in front of the screed, the method further comprising:
   using the distance to determine a height of paving material deposited in front of the screed by the auger.

9. The method of claim 7, further comprising:
   determining the height of the paving material deposited in front of the screed by the auger using data received from the transmitted sonic signal when the visual indicator has the specified shape.

10. The method of claim 7, further comprising:
    adjusting the angle of the sensor relative to the paving material when the visual indicator does not have the specified shape.

11. The method of claim 10, further comprising:
    adjusting an angle of the light emitting device in coordination with adjusting the angle of the sensor relative to the paving material to cause the visual indicator to have the specified shape.

12. The method of claim 11, further comprising:
    integrating the sensor and the light emitting device in a single device.

13. The method of claim 10, further comprising:
    adjusting an angle of the light emitting device based on the angle of the sensor to determine the specified angle.

14. The method of claim 7, wherein the light emitting device comprises three or more lasers to provide the visual indicator, the three or more lasers configurable to project the visual indicator as a two-dimensional pattern of laser points.

15. The method of claim 7, wherein the light emitting device comprises a laser, the method further comprising:
    coupling the laser to an actuator; and
    controlling the actuator to actuate the laser to provide the visual indicator as a two-dimensional shape.

16. The method of claim 7, wherein the specified shape is a regular polygon and the different shape is not a regular polygon.

17. A device to measure a height of paving material deposited in front of a screed by an auger, the device comprising:
    a sensor to transmit a sonic signal to impact a surface of the paving material at a specified angle; and
    a light emitting device to determine an angle of the sensor relative to the surface of the paving material, the light emitting device coupled to the sonic sensor to project an image substantially parallel to a transmit direction of the sonic signal, the light emitting device configured to cause the image to have:
        a specified shape on the surface of the paving material when the angle of the sensor relative to the surface of the paving material matches the specified angle within a threshold angular degree, and
        a different shape on the surface of the paving material when the angle of the sensor relative to the surface of the paving material does not match the specified angle within the threshold angular degree.

18. The device of claim 17, wherein the light emitting device comprises three or more lasers to project the image, the three or more lasers adjustable to project the image as a two-dimensional pattern of laser points.

19. The device of claim 17, wherein the light emitting device comprises a laser to project the image, the laser coupled to an actuator, the actuator controllable to cause the laser to project the image as a shape having at least two-dimensions.

20. The device of claim 17, wherein the specified shape is a regular polygon and the different shape is not a regular polygon.

* * * * *